April 9, 1929.  J. C. MOORE  1,708,368
AUXILIARY TRANSMISSION
Filed June 1, 1925  2 Sheets-Sheet 1
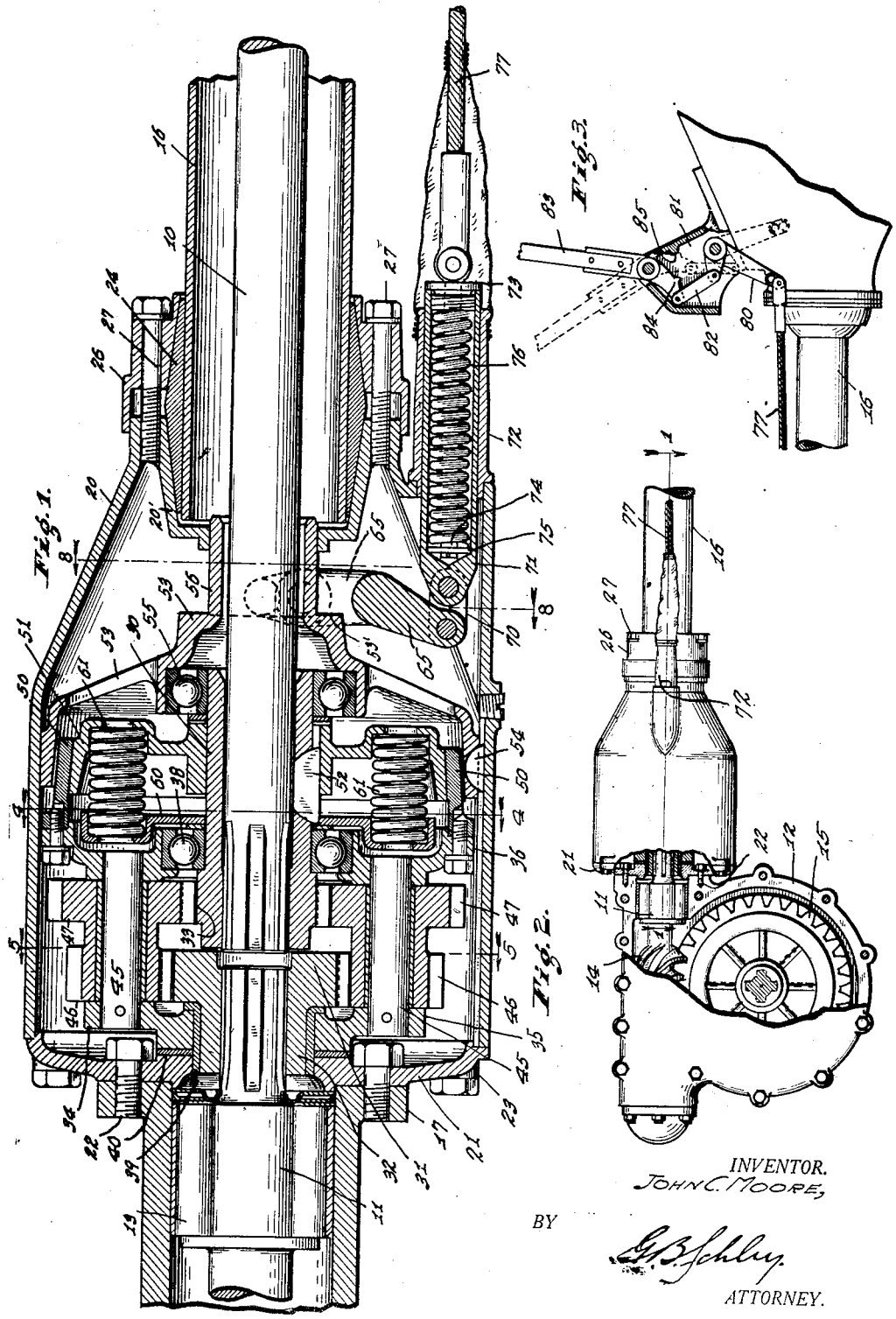
INVENTOR.
JOHN C. MOORE,
BY
ATTORNEY.

April 9, 1929.  J. C. MOORE  1,708,368
AUXILIARY TRANSMISSION
Filed June 1, 1925  2 Sheets-Sheet 2
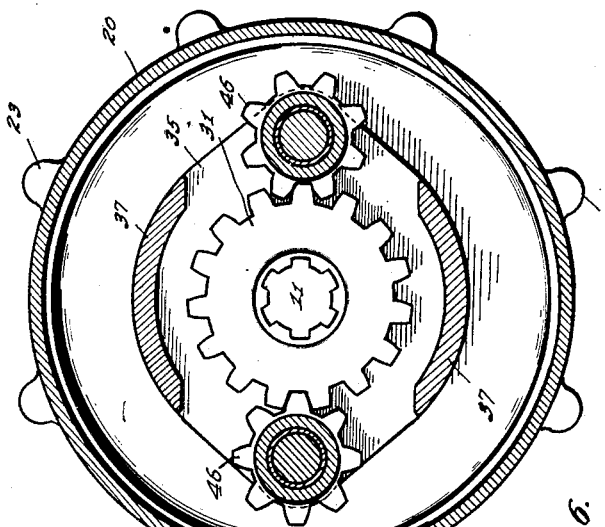
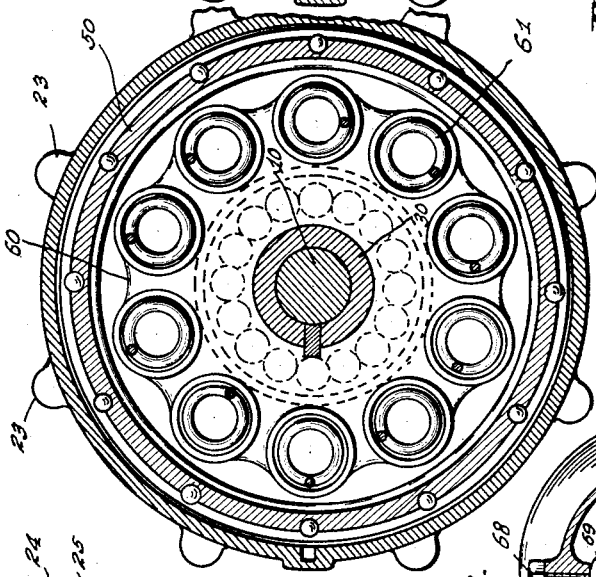
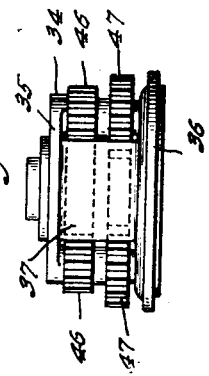
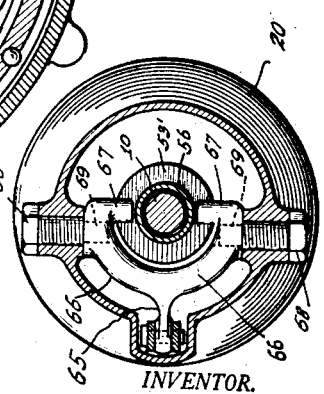
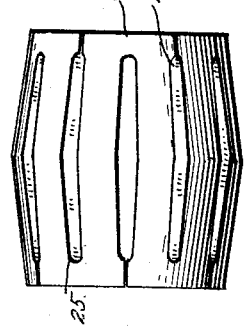
INVENTOR.
JOHN C. MOORE
BY
ATTORNEY.

Patented Apr. 9, 1929.

1,708,368

UNITED STATES PATENT OFFICE.

JOHN C. MOORE, OF CONNERSVILLE, INDIANA, ASSIGNOR TO LINCOLN MANUFACTURING COMPANY, OF CONNERSVILLE, INDIANA, A CORPORATION OF INDIANA.

AUXILIARY TRANSMISSION.

Application filed June 1, 1925. Serial No. 33,897.

It is the object of my invention to provide an auxiliary transmission for automobiles, which transmission may replace the usual direct connection between the propeller-shaft and the drive-shaft for the rear axle and which may be selectively controlled to effect a direct or a speed-changing connection between such two shafts. Further objects of my invention are to produce such a transmission which may be easily and positively operated, which may be installed in an automobile with a minimum amount of alteration in the existing automobile parts, and which may be simply and economically constructed.

I accomplish the above objects by removing the usual sleeve which connects the propeller-shaft and the drive-shaft for the rear axle, and on the end of one of such shafts I mount a sleeve, which is keyed to such shaft by means of the splines normally provided thereon and which extends along said shaft beyond said splines, and I provide speed-changing mechanism adapted to form driving connections of different ratios between this sleeve and the other shaft.

The accompanying drawing illustrates a transmission embodying my invention: Fig. 1 is a horizontal central section through my auxiliary transmission on the line 1—1 of Fig. 2; Fig. 2 is a side elevation in partial section, on a smaller scale, showing the rear axle and transmission; Fig. 3 is a side elevation in partial section showing the auxiliary transmission control lever and its mounting; Fig. 4 is a transverse section on the line 4—4 of Fig. 1; Fig. 5 is a transverse section on the line 5—5 of Fig. 1; Fig. 6 is a plan view of the gear carrier with the gears mounted in it; Fig. 7 is an elevation of the bushing I employ to effect a tight joint between the transmission casing and the end of the propeller-shaft tube; and Fig. 8 is a transverse section on the line 8—8 of Fig. 1.

My transmission is particularly adapted for use on Ford trucks, which are provided with a worm-driven rear axle, although my transmission may be used in other automobiles. As the automobile is manufactured, the adjacent ends of the propeller-shaft 10 and the worm-shaft 11 are customarily splined and directly connected by a sleeve. The worm-shaft 11 is supported in the differential housing 12 by suitable bearings such as the roller bearing 13 shown, and carries a worm 14 mating with a worm gear 15 which is connected through suitable differential mechanism with the rear axles of the automobiles. In the automobile as manufactured, the propeller-shaft tube 16 extends rearwardly to a point adjacent the flange 17 on the differential housing 12 and is there provided with a fitting which is bolted to the flange 17. When my auxiliary transmission is to be installed, the only change which is necessary in the existing parts of the automobile is the removal of the rear end of the tube 16 and the fitting which connects it to the differential housing. The propeller shaft 10 and the worm shaft 11 remain unchanged.

My transmission comprises a casing 20 provided with an end plate 21 which may be attached to the flange 17 of the differential casing 12 by suitable screws 22 and which is attached to the casing 20 by means of bolts passing through lugs 23 on the end plate and on the casing. The front end of the casing 20 is provided with a rearwardly extending inturned, annular flange 20' which forms a central conical recess into which extends the rear end of the shortened propeller-shaft tube 16.

Between the tube 16 and the recess in the casing 20 I provide a bushing 24, which bushing has a central cylindrical bore to fit the exterior of the tube 16. The exterior surface of the bushing 24 tapers from the center toward each end as is clear from Fig. 7. The bushing 24 is provided with an annular series of slots 25, alternate slots extending from one end of the bushing 24 to a point close to the other end as is evident from Fig. 7. One end of the bushing 24 is received within the central conical recess in the casing 20, and the projecting end of the bushing 24 is surrounded by a cap 26 provided with an axial conical bore complementary to the exterior surface of the bushing 24. Suitable screws 27 are provided by which the cap 26 may be drawn toward the housing 20, thus collapsing the bushing 24 and forcing it tightly in engagement with the tube 16.

Rigidly mounted on the end of the propeller-shaft 10 is a sleeve 30 provided with splines mating with the splines on the rear end of such shaft. Between this sleeve 30 and the worm-shaft 11 I provide a speed-changing mechanism which may be of any desired type. In the speed-changing mechanism illustrated, the worm-shaft 11 carries a gear 31 which is provided with a rearwardly extending hub 32. A gear 33 of smaller diameter than the gear 31 is rigidly mounted on the sleeve 30 as by being integral therewith.

Rotatably supported from the sleeve 30 and gear hub 32 is a gear carrier 34. This gear carrier 34 consists of two end-plates 35 and 36 rigidly connected by webs 37. Preferably, an anti-friction bearing, such as the ball-bearing 38, is provided between the forward end plate 36 and the sleeve 30 and a bearing metal bushing 39 is interposed between the end plate 35 and the gear-hub 32. If desired, a bearing metal washer 40 may be interposed between the end plate 35 of the gear carrier 34 and the casing end-plate 21. One or more shafts 45 extend between the end plates 35 and 36. On each of such shafts 45 is rotatably mounted a set of gears 46 and 47 mating respectively with the gears 31 and 33. The two gears 46 and 47 of each set are rigidly connected together as by being made integral.

Secured to the forward side of the gear carrier 34 is an annular clutch ring 50 which is provided interiorly and exteriorly with conical faces. A rotating clutch member 51 slidably mounted on the sleeve 30 but keyed thereto, as by the key 52, has an exterior conical clutch face complementary to and adapted to engage the interior face of the clutch ring 50. Slidably mounted within the casing 20 is an exterior clutch member 53 which is prevented from rotating relative to the casing 20 by means of a key 54. The clutch member 53 has an interior conical surface adapted to engage the exterior surface of the clutch ring 50.

The rear end of the propeller-shaft 10 is supported by an anti-friction bearing centrally mounted in the clutch member 53, such bearing being a combined radial and thrust bearing, as the deep-groove ball bearing 55. Desirably, the clutch member 53 is provided with a forwardly extending sleeve 56 which is slidably supported by the flange 20'.

A spring plate 60, provided with an annular series of recesses, serves to support a plurality of compression springs 61 which tend to force apart the clutch member and the gear-carrier 34 and consequently normally hold the clutch-member 51 in engagement with the clutch-ring 50 to lock the gear carrier 34 to the sleeve 30. In acting to hold the clutch member 51 in engagement with the clutch ring 50, the springs 61 serve also to hold the clutch member 53 normally out of engagement with the clutch ring 50, as the force such springs exert is transmitted to the clutch member 53 through the clutch member 51 and the bearing 55.

Pivotally mounted within the casing 20 is a clutch-operating lever 65. The lever 65 is provided with two arms 66, each of which carries a boss 67 adapted to bear against the shoulder 53' on the clutch-member 53. The lever 65 is mounted in the casing 20 by means of two screws 68 passing through the wall of the casing and bearing on their inner ends co-axial cylindrical portions 69 which enter holes in the arms 66. The outer end of the lever 65 is connected by a link 70 with a hollow cylinder 71 slidably mounted in an extension 72 of the casing 20. The hollow cylinder 71 is provided on its outer end with a cap 73, through an axial hole in which passes a rod 74. The rear end of the rod 74 carries a washer 75 between which and the cap 73 there acts a compression spring 76, and the front end of the rod 74 is connected in any suitable manner to a cable 77 which extends forwardly of the automobile and is under the driver's control. When the cable 77 is drawn forwardly, the lever 65 moves the clutch members 53 and 51 rearwardly against the pressure exerted by the springs 61 to first disengage the clutch member 51 from the clutch ring 50 and then to bring the clutch member 53 into engagement with the clutch ring 50. Further movement of the cable 77 in the forward direction merely compresses the coil spring 76.

The forward end of the cable 77 is attached to one arm of a bell crank 80, which may be pivotally mounted in a casing 81 supported on any convenient part of the automobile. That arm of the bell crank 80 which is not connected to the cable 77 is connected by a link 82 with the control lever 83 which is pivotally mounted in the casing 81. The bell crank 80, the link 82, and the control lever 83 are arranged to form a self-locking toggle; the movement of the lever 83 which is necessary to lock the toggle being made possible by the compression of the spring 76 after the clutch member 53 has engaged the clutch ring 50.

To effect a direct-drive connection between the propeller shaft 10 and the worm-shaft 11, the lever 83 is moved forward to the full-line position shown in Fig. 3. Such movement of the lever 83 lessens the tension in the cable 77 and permits the springs 61 to force the clutch member 51 into engagement with the clutch ring 50. In this position of the clutch member 51, the outer clutch member 53 is disengaged from the clutch ring 50. Engagement of the clutch member 51 with the clutch ring 50 locks the gear carrier 34 to the propeller shaft 10, and each set of gears 46 and 47 is thus prevented from rotating on their associated shaft 45. As no rotation of the gear 46 about the shaft 45 takes place, the gear 31 will be rotated at the same speed as the propeller-shaft 10. When it is desired to use my transmission as a speed-changing connection between the propeller-shaft 10 and the worm-shaft 11, the control lever 83 is moved rearwardly and draws the cable 77 forwardly. Forward movement of the cable 77 operates first to disengage the clutch member 51 from the clutch ring 50 and then to engage the outer clutch member 53 with the clutch ring. Further rearward movement of the control lever 83 compresses the spring 76, and when the control lever has reached the dotted line position shown in Fig. 3, the toggle formed by the lower end of the control lever, the link 82, and the bell crank 80 has passed its locking position and the force exerted by the compression spring 76 serves to hold the toggle locked with the stop 84 on the lower end of the control lever 83 in engagement with the stop 85 on the casing 81. With the clutch member 51 disengaged from and the clutch member 53 engaged with the clutch ring 50, the gear carrier 34 is locked to the casing 20 and rotation of the gear carrier is thus prevented. As the propeller shaft 10 rotates, the gear 33 drives the gears 47; and the gears 46, which are rigidly connected to the gears 47, drive the gear 31 at an altered speed, the amount of the speed change depending upon the relative sizes of the gears 31, 46, 33, and 47.

The type of transmission described affords a direct and a speed-reducing connection between the sleeve 30 and the worm-shaft 11. It will be evident that by making the gear 31 of smaller diameter than the gear 33 a speed-increasing connection may be had instead of the speed-reducing connection shown. The sleeve 30, keyed to the propeller shaft by the splines thereon and extending forward beyond such splines, makes it possible to provide a speed-changing mechanism between the two shafts 10 and 11 without altering these shafts in any way. Obviously, this sleeve may be employed to advantage with other types of speed-changing mechanism than that shown and described, to permit using without change the two shafts 10 and 11 as made by the automobile manufacturer.

I claim as my invention:—

In combination with the differential casing, the rear axle drive shaft, the propeller-shaft, and the propeller-shaft tube of an autotmobile, a variable speed transmission connecting the ends of said two shafts, and a casing enclosing said transmission, said transmission including a two-member clutch, one member of which is supported from said casing and slidable axially thereof, said clutch member being arranged to support said propeller shaft.

In witness whereof, I have hereunto set my hand at Connersville, Indiana, this 27th day of May, A. D. one thousand nine hundred and twenty-five.

JOHN C. MOORE.